United States Patent
Fujimori

(10) Patent No.: US 10,423,282 B2
(45) Date of Patent: Sep. 24, 2019

(54) DISPLAY APPARATUS THAT SWITCHES MODES BASED ON DISTANCE BETWEEN INDICATOR AND DISTANCE MEASURING UNIT

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/056,093

(22) Filed: Feb. 29, 2016

(65) Prior Publication Data

US 2016/0259486 A1 Sep. 8, 2016

(30) Foreign Application Priority Data

Mar. 5, 2015 (JP) ................................ 2015-043267

(51) Int. Cl.
*G06F 3/042* (2006.01)
*G06F 3/01* (2006.01)
(Continued)

(52) U.S. Cl.
CPC ............ *G06F 3/0425* (2013.01); *G06F 3/017* (2013.01); *G06F 3/038* (2013.01); *G06F 3/0346* (2013.01);
(Continued)

(58) Field of Classification Search
CPC .... G06F 3/0425; G06F 3/017; G06F 3/03542; G06F 3/0416; G06F 3/04883; G06F 3/0346; G06F 3/038; G06F 3/03545
See application file for complete search history.

(56) References Cited

U.S. PATENT DOCUMENTS 9,041,695 B2 5/2015 Ichieda
2009/0217211 A1* 8/2009 Hildreth ................. G06F 3/017
715/863
(Continued)

FOREIGN PATENT DOCUMENTS

JP H10-240442 A 9/1998
JP 2008-116874 A 5/2008
(Continued)

*Primary Examiner* — Temesghen Ghebretinsae
*Assistant Examiner* — Ivelisse Martinez Quiles
(74) *Attorney, Agent, or Firm* — Oliff PLC

(57) ABSTRACT

A projector includes a determining unit configured to determine whether the distance between an operation device and a distance measuring unit configured to measure a distance to the operation device is a first threshold or less, a switching unit configured to switch, when a mode of the projector is a first mode, the mode from the first mode to a second mode when it is determined that the distance between the operation device and the distance measuring unit is the first threshold or less, a detecting unit configured to detect the position indicated by the operation device, and a processing unit configured to, when indication of a first position on the screen is detected, perform first processing corresponding to the first position when the mode is the first mode and perform second processing different from the first processing corresponding to the first position when the mode is the second mode.

9 Claims, 13 Drawing Sheets

(51) Int. Cl.
*G06F 3/0346* (2013.01)
*G06F 3/038* (2013.01)
*G06F 3/041* (2006.01)
*G06F 3/0488* (2013.01)
*G06F 3/0354* (2013.01)

(52) U.S. Cl.
CPC ...... *G06F 3/03542* (2013.01); *G06F 3/03545* (2013.01); *G06F 3/0416* (2013.01); *G06F 3/04883* (2013.01)

(56) References Cited

U.S. PATENT DOCUMENTS

| | | | |
|---|---|---|---|
| 2011/0050610 A1* | 3/2011 | Pearce | G06F 3/038 345/173 |
| 2012/0105326 A1* | 5/2012 | Jeong | G06F 3/002 345/158 |
| 2012/0218183 A1* | 8/2012 | Givon | G06F 3/017 345/157 |
| 2012/0326995 A1* | 12/2012 | Zhang | G06F 3/0425 345/173 |
| 2013/0135263 A1 | 5/2013 | Omura | |
| 2013/0162607 A1 | 6/2013 | Ichieda | |
| 2013/0215027 A1* | 8/2013 | Van Lydegraf | G06F 3/017 345/158 |
| 2013/0300658 A1 | 11/2013 | Endo et al. | |
| 2014/0062958 A1 | 3/2014 | Onishi | |
| 2014/0340311 A1* | 11/2014 | Holz | B65D 75/5877 345/158 |
| 2014/0340465 A1* | 11/2014 | Shi | H04N 7/15 348/14.03 |
| 2015/0002425 A1* | 1/2015 | Lee | G06F 3/0416 345/173 |
| 2015/0138083 A1 | 5/2015 | Takano | |
| 2015/0154777 A1* | 6/2015 | Ozawa | G06T 11/60 345/629 |
| 2015/0220149 A1* | 8/2015 | Plagemann | G06F 3/017 715/856 |
| 2016/0252984 A1* | 9/2016 | Fujimori | G06F 3/04883 345/179 |
| 2016/0253044 A1* | 9/2016 | Katz | G06F 3/017 |
| 2017/0083197 A1* | 3/2017 | Lee | G06F 3/048 |
| 2017/0097697 A1* | 4/2017 | Dojo | G06F 3/0383 |

FOREIGN PATENT DOCUMENTS

| | | |
|---|---|---|
| JP | 2013-003842 A | 1/2013 |
| JP | 2013-134409 A | 7/2013 |
| JP | 2013-235416 A | 11/2013 |
| JP | 5454722 B2 | 3/2014 |
| WO | 2014/041732 A1 | 3/2014 |

* cited by examiner

DISPLAY APPARATUS THAT SWITCHES MODES BASED ON DISTANCE BETWEEN INDICATOR AND DISTANCE MEASURING UNIT

The entire disclosure of Japanese Patent Application No. 2015-043267, filed Mar. 5, 2015 is expressly incorporated by reference herein

BACKGROUND

1. Technical Field

The present invention relates to a technique for switching a mode of a display apparatus using an indicator.

2. Related Art

In a display apparatus such as a projector, a plurality of modes for designating processing performed when a position on a display surface where an image is displayed is indicated using an indicator are sometimes prepared. A technique concerning switching of the modes is disclosed in JP-A-2013-134409 (Patent Literature 1). Patent Literature 1 mentions that a projector displays a menu bar on a screen and, when a button arranged on the menu bar is indicated by an indicator, alternately switches a PJ interactive mode and a PC interactive mode. Further, Patent Literature 1 also mentions that, rather than displaying the menu bar, when a predetermined region on the screen is indicated by the indicator, the projector alternately switches these modes.

In the technique described in Patent Literature 1, in order to instruct the switching of the modes, a user has to perform operation for indicating a predetermined position on the display surface with the indicator. For example, when the user frequently desires to switch the modes or when a position that should be indicated by the indicator is far from the user, the user sometimes feels it annoying to perform operation for switching the modes.

SUMMARY

An advantage of some aspects of the invention is to reduce labor and time required of a user to switch modes of a display apparatus.

A display apparatus according to an aspect of the invention displays an image on a display surface, and includes: a determining unit configured to determine whether the distance between an indicator for indicating a position on the display surface and a distance measuring unit for measuring the distance to the indicator is a first threshold or less; a switching unit configured to switch, when a mode of the display apparatus is a first mode, the mode from the first mode to a second mode when it is determined that the distance between the indicator and the distance measuring unit is the first threshold or less; a detecting unit configured to detect the position on the display surface indicated by the indicator; and a processing unit configured to, when indication of a first position on the display surface is detected, perform first processing corresponding to the first position when the mode is the first mode and perform second processing different from the first processing corresponding to the first position when the mode is the second mode.

According to this aspect, when the distance between the indicator and the distance measuring unit for measuring the distance to the indicator is the first threshold or less, the mode is switched from the first mode to the second mode. Consequently, it is possible to reduce labor and time required of a user to switch the mode of the display apparatus.

In the display apparatus according to the aspect of the invention, the switching unit may switch the mode from the first mode to the second mode when the distance between the indicator and the distance measuring unit continues to be determined as the first threshold or less for a predetermined time or more.

According to the aspect of the invention with this configuration, when the distance between the indicator and the distance measuring unit is the first threshold or less without being intended by the user, it is possible to reduce the likelihood of switching of the mode from the first mode to the second mode.

In the display apparatus according to the aspect of the invention, the switching unit may perform, when a posture of the indicator is a first posture, the switching of the mode from the first mode to the second mode at the time when it is determined that the distance between the indicator and the distance measuring unit is the first threshold or less and may not perform, when the posture of the indicator is a second posture different from the first posture, the switching of the mode from the first mode to the second mode at the time when it is determined that that the distance between the indicator and the distance measuring unit is the first threshold or less.

According to the aspect of the invention with this configuration, it is possible to control presence or absence of the switching of the mode from the first mode to the second mode according to the posture of the indicator used by the user.

In the display apparatus according to the aspect of the invention, the display surface may be a projection surface on which the image is projected, the display apparatus may further include a projecting unit configured to project the image on the projection surface, and the first posture is a posture in which the indicator faces a direction of the projecting unit.

According to the aspect of the invention with this configuration, when the user indicates a position on the display surface using the indicator, it is possible to reduce the likelihood that the mode is switched from the first mode to the second mode against the will of the user.

In the display apparatus according to the aspect of the invention, when the distance between the indicator and the display surface is a second threshold or less, the switching unit may not switch the mode from the first mode to the second mode.

According to the aspect of the invention with this configuration, when the indicator is close to the display surface, it is possible to prevent the mode from being switched from the first mode to the second mode against the will of the user.

In the display apparatus according to the aspect of the invention, the display apparatus may further include a notifying unit configured to notify a user that the mode is switched from the first mode to the second mode.

According to the aspect of the invention with this configuration, it is possible to allow the user to easily grasp that the mode is switched from the first mode to the second mode.

In the display apparatus according to the aspect of the invention, when a plurality of the indicators including a first indicator and a second indicator different from the first indicator are used, when it is determined that the distance between the first indicator and the distance measuring unit is the first threshold or less, the switching unit may switch the mode from the first mode to the second mode and may not perform the switching of the mode from the first mode to the second mode due to the determination that the distance between the second indicator and the distance measuring unit is the first threshold or less.

According to the aspect of the invention with this configuration, it is possible to switch the mode from the first mode to the second mode according to the will of the user of the first indicator.

In the display apparatus according to the aspect of the invention, a plurality of the indicators may exist, and the switching unit may specify the first threshold for each individual of the indicators.

According to the aspect of the invention with this configuration, it is possible to specify, for each of the indicators, a condition of the distance between the indicator and the distance measuring unit for switching the mode from the first mode to the second mode.

A control method for a display apparatus that displays an image on a display surface according to another aspect of the invention includes: determining whether the distance between an indicator for indicating a position on the display surface and a distance measuring unit for measuring the distance to the indicator is a first threshold or less; switching, when a mode of the display apparatus is a first mode, the mode from the first mode to a second mode when it is determined that the distance between the indicator and the distance measuring unit is the first threshold or less; detecting the position on the display surface indicated by the indicator; and, when indication of a first position on the display surface is detected, performing first processing corresponding to the first position when the mode is the first mode and performing second processing different from the first processing corresponding to the first position when the mode is the second mode.

According to this aspect, when the distance between the indicator and the distance measuring unit for measuring the distance to the indicator is the first threshold or less, the mode is switched from the first mode to the second mode. Consequently, it is possible to reduce labor and time required of a user to switch the mode of the display apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments

Embodiments of the invention are explained below with reference to the drawings.

Figure 1:
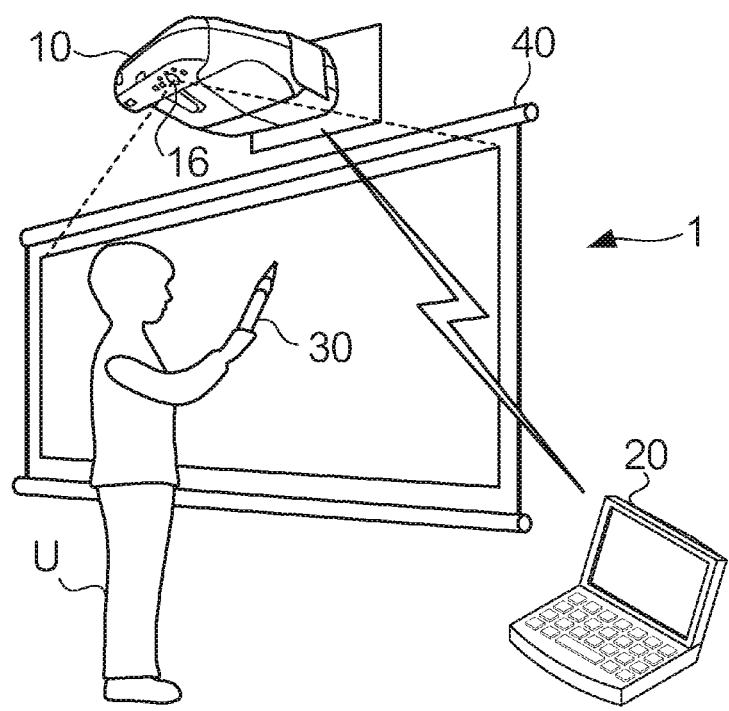
FIG. 1 is a diagram showing the overall configuration of a display system according to an embodiment of the invention.

FIG. 1 is a diagram showing the overall configuration of a display system 1 according to an embodiment of the invention. The display system 1 includes a projector 10, an information processing apparatus 20, and an operation device 30.

The projector 10 is a short-focus projector of a wall hanging-type and is a projection-type display apparatus that projects an image on a screen 40 set at a short distance using a projecting unit 16. The projector 10 is set on the ceiling of a room. The projector 10 projects a color image on the screen 40 on the basis of, for example, image signals corresponding to color components of three primary colors of R (Red), G (Green), and B (Blue). The screen 40 is a reflection-type screen and is a projection surface on which an image is projected. The projection surface may be a wall or the like other than the screen and is an example of a display surface on which an image is displayed. The projector 10 functions as an interactive whiteboard (an electronic blackboard) and performs processing corresponding to operation performed on the screen 40 by a user U using the operation device 30. As modes (operation modes) for designating the processing, there are an interactive mode and a PC mode explained below.

The information processing apparatus 20 is, for example, a general-purpose personal computer and is an apparatus functioning as a signal source (a video source) of an image signal input to the projector 10. The information processing apparatus 20 displays, for example, an application screen. The application screen is a screen displayed according to execution of an application program in the information processing apparatus 20. The information processing apparatus 20 is connected to the projector 10 by radio. However, the information processing apparatus 20 may be connected by wire. A method of connection may be any method.

The operation device 30 is, for example, a pen-type device and is an indicator used by the user U to indicate a position on the screen 40. The operation device 30 is not limited to the pen-type device and may be an operation device of another shape such as a bar shape. In FIG. 1, one operation device 30 used by the user U is shown. However, in some case, the operation devices 30 used by other users are also present and a plurality of operation devices are used.

Figure 2:
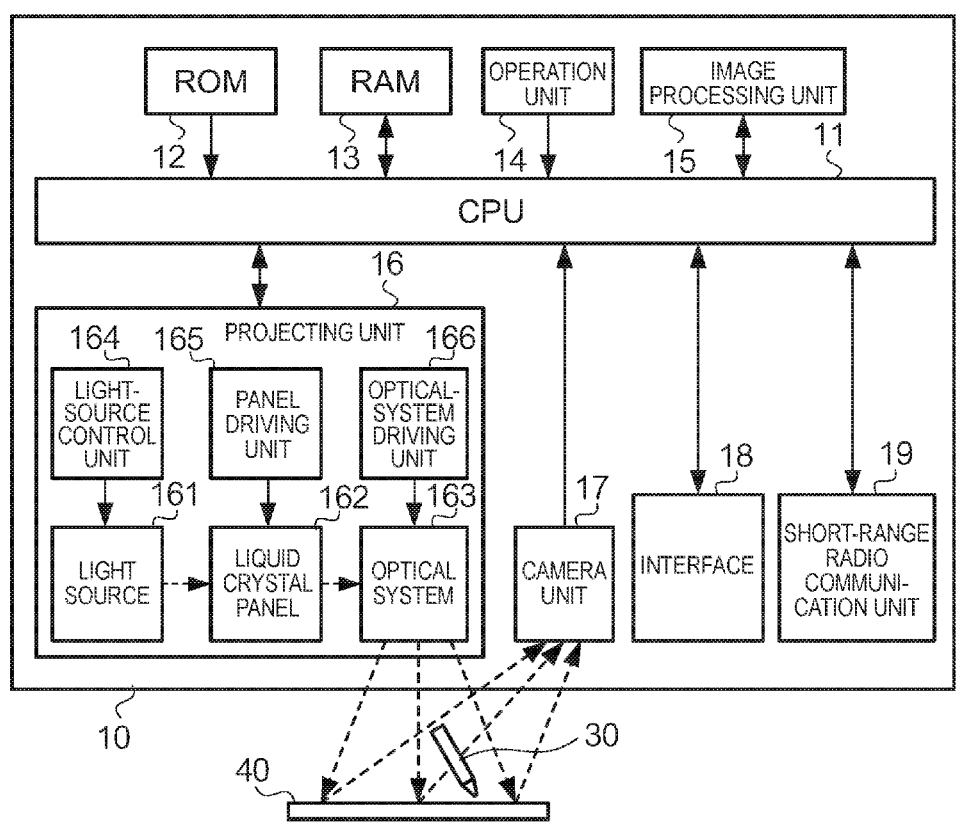
FIG. 2 is a block diagram showing the hardware configuration of a projector according to the embodiment.

FIG. 2 is a block diagram showing the hardware configuration of the projector 10. As shown in FIG. 2, the projector 10 includes a CPU (Central Processing Unit) 11, a ROM (Read Only Memory) 12, a RAM (Random Access Memory) 13, an operation unit 14, an image processing unit 15, a projecting unit 16, a camera unit 17, an interface 18, and a short-range radio communication unit 19.

The CPU 11 is a processor that controls the units of the projector 10 by reading out a computer program stored in a storing unit such as the ROM 12 to the RAM 13 and executing the computer program. The CPU 11 has a function of a timer. The operation unit 14 is an operation means including operators for performing various kinds of operation such as ON/OFF of a power supply of the projector 10.

The image processing unit 15 includes an image processing circuit such as an ASIC (Application Specific Integrated Circuit) and manages image processing performed by the projector 10. The image processing unit 15 performs, according to the control by the CPU 11, predetermined image processing such as resize processing and keystone correction on, for example, an image signal input to the interface 18 and generates image information.

The projecting unit 16 projects an image on the screen 40 on the basis of image information after the image processing by the image processing unit 15. The projecting unit 16 includes a light source 161, a liquid crystal panel 162, an optical system 163, a light-source control unit 164, a panel driving unit 165, and an optical-system driving unit 166. The light source 161 is, for example, a solid-state light source including an LED (Light Emitting Diode) or a semiconductor diode. The light source 161 emits light to the liquid crystal panel 162. The liquid crystal panel 162 is, for example, a transmission-type liquid crystal panel and is a light modulator that modulates light made incident from the light source 161. The liquid crystal panel 162 is provided to correspond to the respective three primary colors of RGB. The optical system 163 includes, for example, a lens and a driving circuit for lens adjustment, expands the light (image light) modulated by the liquid crystal panel 162, and projects the light on the screen 40. The light-source control unit 164 drives the light source 161 according to the control by the CPU 11. The panel driving unit 165 drives the liquid crystal panel 162 on the basis of image information supplied from the CPU 11. The optical-system driving unit 166 drives the driving circuit of the optical system 163 according to the control by the CPU 11.

Note that, as the light modulator, a reflection-type liquid crystal panel may be adopted or a digital micro-mirror device (DMD) or the like may be adopted.

The camera unit 17 includes an image sensor (e.g., a CMOS sensor or a CCD sensor) and picks up an image of the screen 40. The CPU 11 detects the position of the operation device 30 and identifies the individual operation device 30 on the basis of emitted light of operation device 30, an image of which is picked up by the camera unit 17.

Note that the projector 10 may detect a position indicated by reflected light of the operation device 30 according to, for example, a method of detecting the position using a light curtain or the like. The projector 10 may detect a position indicated by the operation device 30 by recognizing the shape of the operation device 30 through pattern recognition or the like.

The interface 18 is an interface for connecting the projector 10 to the information processing apparatus 20 by radio.

The short-range radio communication unit 19 includes, for example, a radio communication circuit and an antenna. The short-range radio communication unit 19 is connected to an external apparatus present within a predetermined distance by radio. The short-range radio communication unit 19 performs short-range radio communication conforming to the standard of Bluetooth (registered trademark). The short-range radio communication unit 19 measures the distance to the operation device 30 on the basis of the intensity of a signal (a radio wave) of the short-range radio communication received from the operation device 30. That is, the short-range radio communication unit 19 corresponds to a distance measuring unit configured to measure the distance to the operation device 30.

Figure 3:
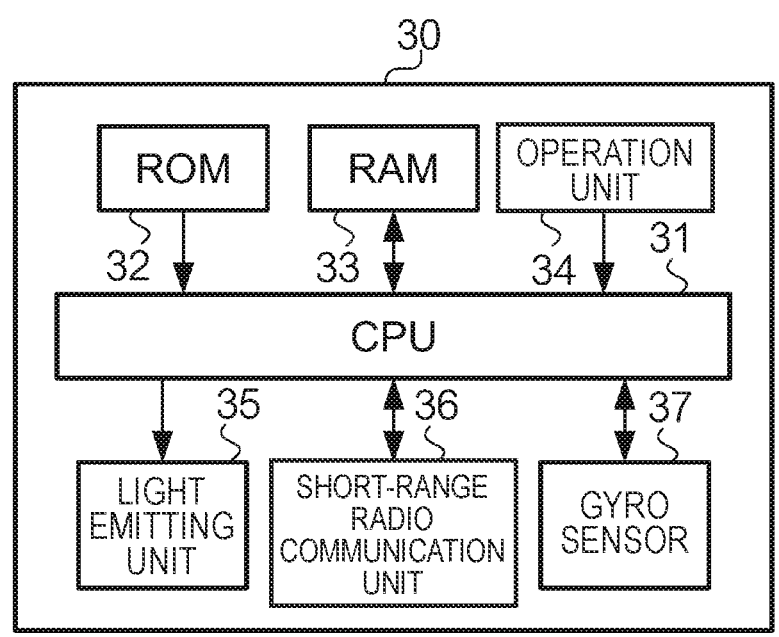
FIG. 3 is a block diagram showing the hardware configuration of an operation device according to the embodiment.

FIG. 3 is a block diagram showing the hardware configuration of the operation device 30. As shown in FIG. 3, the operation device 30 includes a CPU 31, a ROM 32, a RAM 33, an operation unit 34, a light emitting unit 35, a short-range radio communication unit 36, and a gyro sensor 37.

The CPU 31 is a processor that controls the units of the operation device 30 by reading out a computer program stored in the ROM 32 to the RAM 33 and executing the computer program. The operation unit 34 is an operation unit including, for example, physical keys and operated by the user U. The light emitting unit 35 includes, for example, an infrared light emitting diode and emits light under the control by the CPU 11. The CPU 11 controls the light emitting unit 35 to repeatedly emit light at a predetermined interval. The short-range radio communication unit 36 performs short-range radio communication conforming to a standard same as the standard to which the short-range radio communication unit 19 conforms, that is, the standard of Bluetooth. The CPU 11 can transmit data to the projector 10 via the short-range radio communication unit 36. The gyro senor 37 is a sensor for measuring a posture (a tilt) of the operation device 30.

Figure 4A:
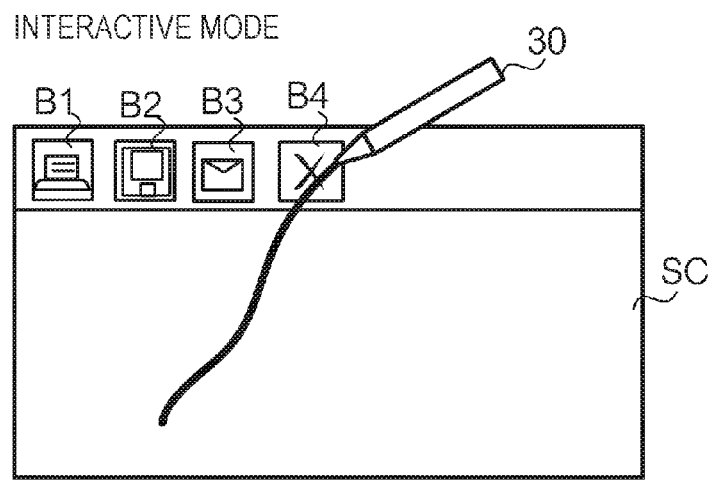
FIGS. 4A and 4B are explanatory diagrams of modes of the projector according to the embodiment.
Figure 4B:
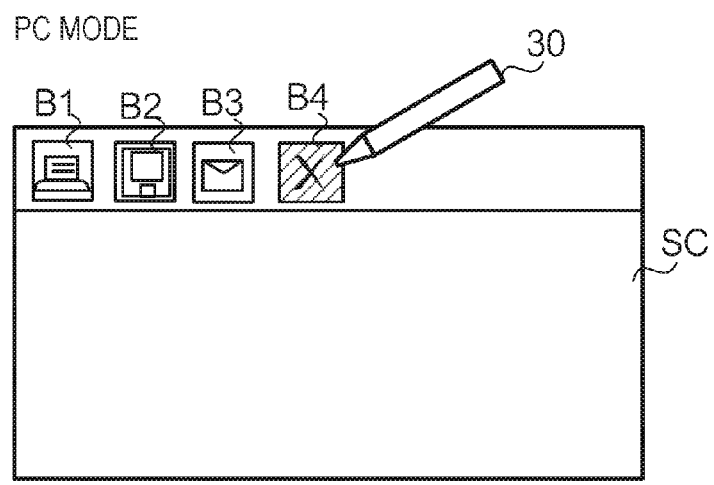

FIGS. 4A and 4B are diagrams for explaining modes of the projector 10. As shown in FIGS. 4A and 4B, it is assumed that an application screen SC of the information processing apparatus 20 is displayed on the screen 40. On the application screen SC, icons B1 to B4 are displayed as objects selectable by the user U. The respective icons B1 to B4 are objects for instructing, in order, printing of the application screen SC, storage, mail transmission, and erasing of a track image. These kinds of processing are only examples. Other kinds of processing such as an undo operation may be included. Besides the icons, objects selectable by the user U such as buttons and menus may be displayed.

The interactive mode is a mode in which, when a position on the screen 40 is indicated by the operation device 30, processing for drawing an image corresponding to a track of the indicated position (hereinafter referred to as "track image") is performed. As shown in FIG. 4A, when, for example, a position where the icon B4 is displayed is indicated by the operation device 30, a track image is drawn in the position. When positions where the icons B1 to B3 are displayed are indicated, track images are drawn in the positions.

The PC mode is a mode in which, when a position on the screen 40 is indicated by the operation device 30, processing for selecting an object corresponding to the indicated position is performed. That is, in the PC mode, the operation device 30 is used as a pointing device. As shown in FIG. 4B, when a position where by icon B4 is displayed is indicated by the operation device 30, processing for selecting the icon B4 is performed. In this way, even when the operation device 30 indicates the same position, processing to be executed is different depending on the modes.

Note that one of the interactive mode and the PC mode corresponds to the first mode according to the invention and the other mode corresponds to the second mode. The processing performed in one of the interactive mode and the PC mode corresponds to the first processing according to the invention. The processing performed in the other mode corresponds to the second processing according to the invention.

Figure 5:
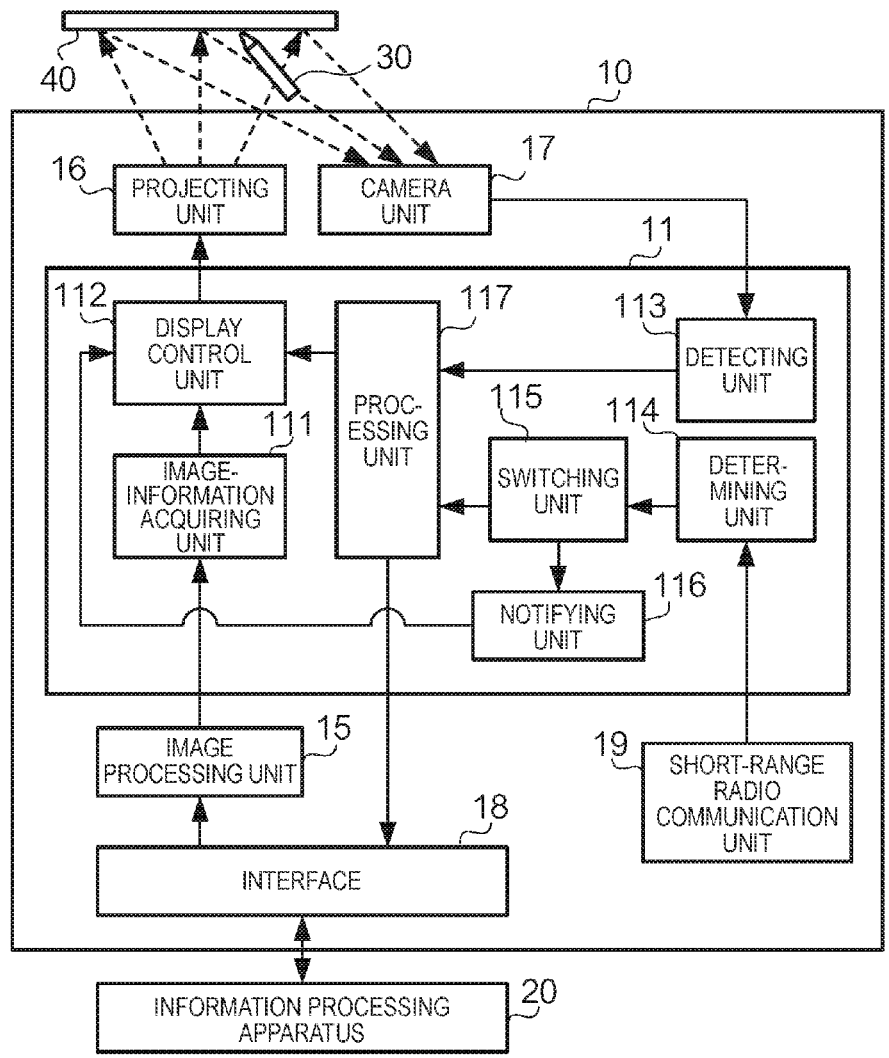
FIG. 5 is a block diagram of the functional configuration of a CPU of the projector according to the embodiment.

FIG. 5 is a block diagram showing the functional configuration of the CPU 11 of the projector 10. The CPU 11 executes a computer program to thereby realize functions equivalent to an image-information acquiring unit 111, a display control unit 112, a detecting unit 113, a determining unit 114, a switching unit 115, a notifying unit 116, and a processing unit 117.

The image-information acquiring unit 111 is means for acquiring image information when the image information is generated by the image processing unit 15 on the basis of an image signal input to the interface 18 from the information processing apparatus 20.

The display control unit 112 is means for performing control for displaying (that is, projecting) an image on the screen 40. The display control unit 112 causes the screen 40 to display an image corresponding to the image information acquired by the image-information acquiring unit 111. Further, when the projector 10 is in the interactive mode, the display control unit 112 performs control for drawing a track image.

The detecting unit 113 is means for detecting a position on the screen 40 indicated by the operation device 30. The detecting unit 113 analyzes picked-up image data representing a picked-up image of the camera 17 and detects a coordinate of the position of the operation device 30, for example, the position of the distal end of the operation device 30.

The determining unit 114 is means for determining whether the distance between the operation device 30 and the short-range radio communication unit 19 is a first threshold or less. The distance is equal to the distance between the operation device 30 and the projector 10. The determining unit 114 performs the determination on the basis of the intensity of a signal of short-range radio communication received from the operation device 30 via the short-range radio communication unit 19.

The switching unit 115 is means for switching the modes of the projector 10. In the case of one of the interactive mode and the PC mode, when the determining unit 114 determines that the distance is the first threshold or less, the switching unit 115 switches the mode to the other mode. That is, approach of the operation device 30 and the projector 10 is an opportunity for switching of the modes in the projector 10. The switching unit 115 sometimes controls the switching of the modes on the basis of other conditions in addition to the distance between the operation device 30 and the projector 10.

The notifying unit 116 is means for notifying the user U that the modes are switched by the switching unit 115. The notifying unit 116 instructs the display control unit 112 to perform the notification through, for example, display on the screen 40. As specific examples of the display, there are display of a message or an icon and a change of a displayed cursor. A method of the notification is not limited to the display and may be an output of sound, vibration of the operation device 30, or the like.

The processing unit 117 is means for performing, when indication of a certain position (corresponding to the first position according to the invention) on the screen 40 is detected by the detecting unit 113, processing corresponding to the position and the mode of the projector 10. When the mode is the interactive mode, in order to draw a track image corresponding to the position, the processing unit 117 supplies coordinate data representing a coordinate of the indicated position to the display control unit 112. When the mode is the PC mode, in order to select an object of the position, the processing unit 117 outputs the coordinate data representing the coordinate of the indicated position to the information processing apparatus 20 via the interface 18.

Operations in this embodiment are explained below.

A: Basic Operation

Figure 6:
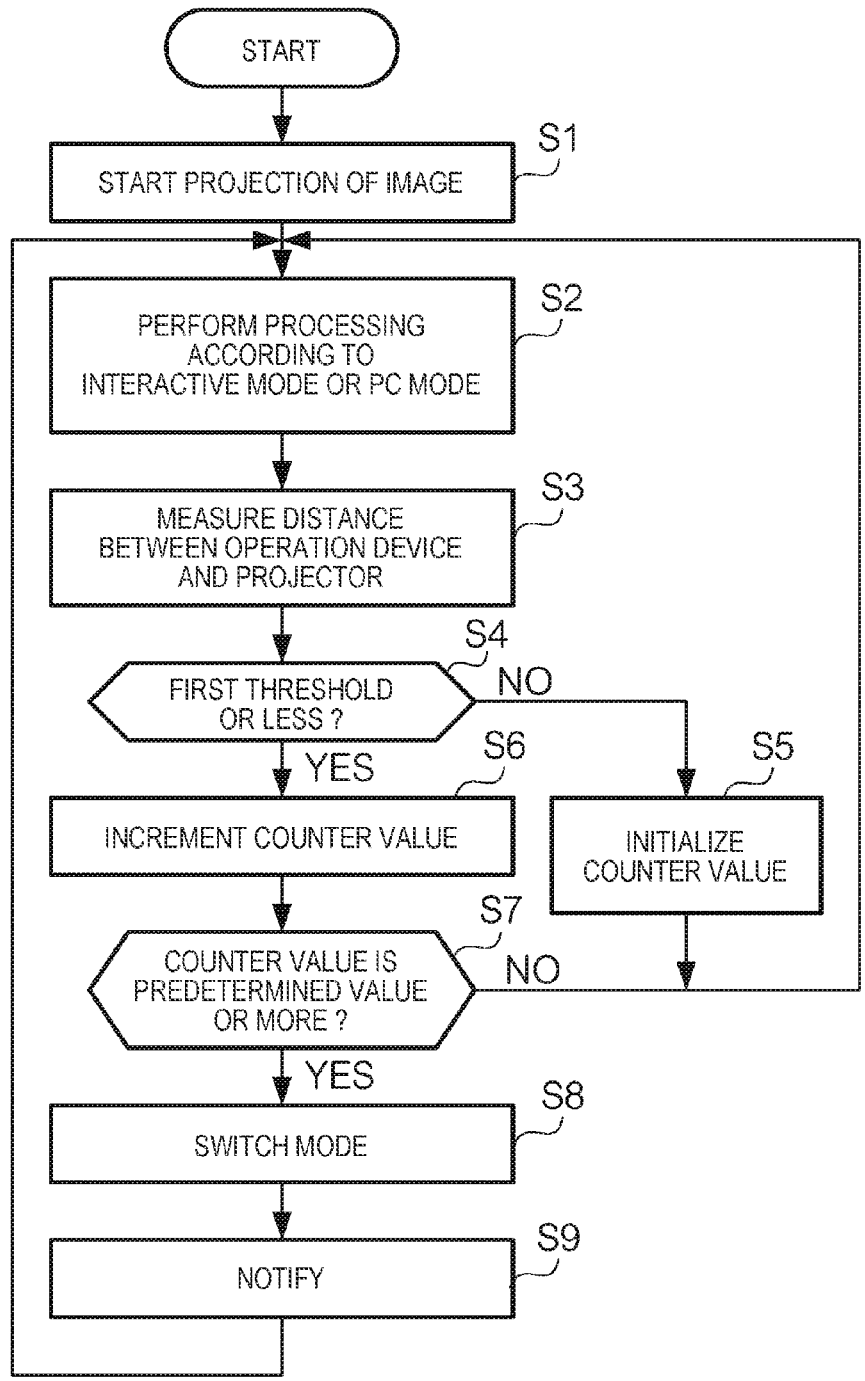
FIG. 6 is a flowchart for explaining a basic operation of switching of the modes of the projector according to the embodiment.

FIG. 6 is a flowchart for explaining a basic operation of the switching of the mode of the projector 10. Before the operations explained below, a counter value of a timer of the CPU 11 is an initial value "0".

The CPU 11 of the projector 10 starts, on the basis of acquired image information, projection of an image on the screen 40 using the projecting unit 16 (step S1). The CPU 11 causes the screen 40 to display the application screen SC explained with reference to FIGS. 4A and 4B.

After the start of the projection of the image, the CPU 11 performs processing according to the interactive mode or the PC mode (step S2). It is assumed that the mode of the projector 10 is the interactive mode. As explained with reference to FIG. 4A, the CPU 11 performs, according to a position on the screen 40 indicated by the operation device 30, processing for drawing a track image.

Subsequently, the CPU 11 measures the distance between the operation device 30 and the projector 10 (step S3). The CPU 11 measures a distance on the basis of the intensity of a signal of short-range radio communication received from the operation device 30 via the short-range radio communication unit 19. The distance may be specified by a value (e.g., a meter value) directly indicating the distance between the operation device 30 and the projector 10 or may be specified by a value (e.g., the intensity of a signal) indirectly indicating the distance.

Subsequently, the CPU 11 determines whether the distance between the operation device 30 and the projector 10 is a first threshold or less (step S4). The first threshold may be set before shipment of the projector 10 or may be set by manual setting, calibration, or the like by the user U. When the intensity of the signal is −20 dBm or more, for example, the CPU 11 determines that the distance is the first threshold or less. If determining that the intensity of the signal is more than the first threshold (NO in step S4), the CPU 11 initializes the counter value of the timer (step S5). According to the initialization, the counter value is set to "0". The CPU 11 returns the processing to the processing in step S2.

Figure 7A:
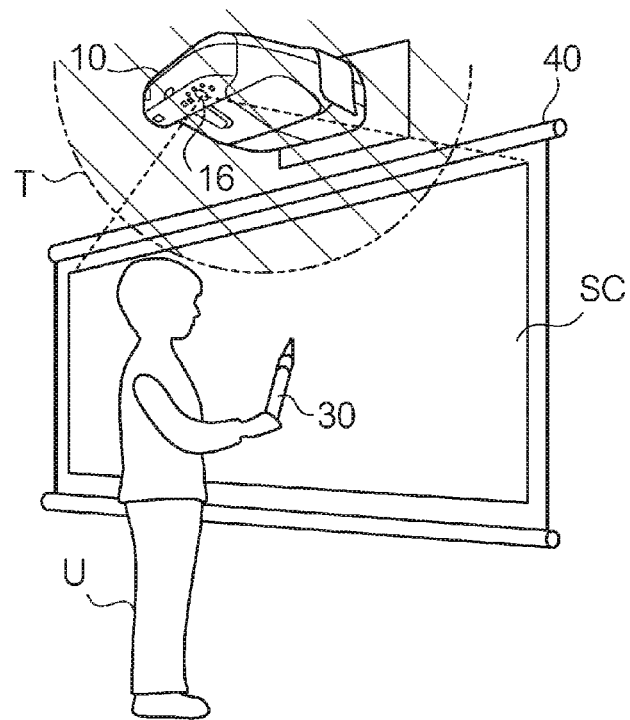
FIGS. 7A and 7B are explanatory diagrams of actions taken by a user when switching the modes of the projector according to the embodiment.
Figure 7B:
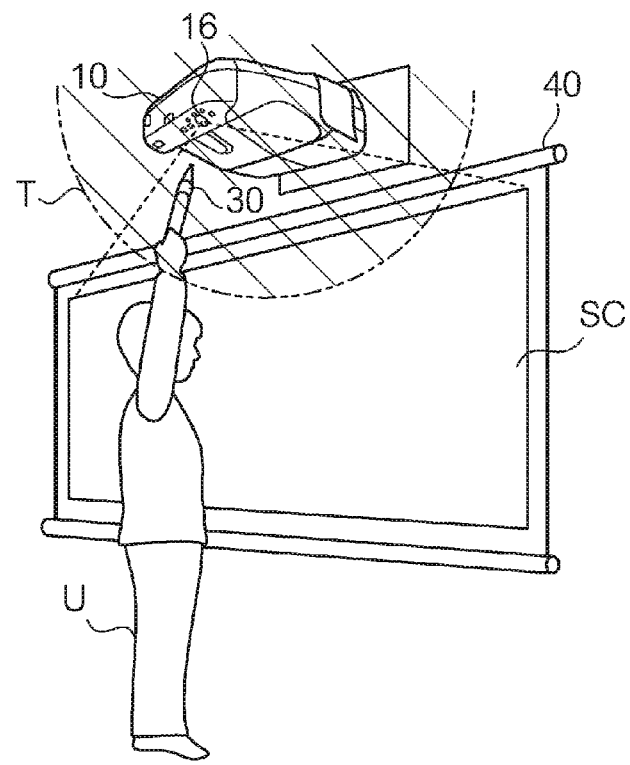

FIGS. 7A and 7B are diagrams for explaining actions taken by the user U when switching the mode of the projector 10. In FIGS. 7A and 7B, hatched portions indicate a range T in which the distance from the projector 10 is the first threshold or less. In the short-range radio communication conforming to the standard of Bluetooth, directivity of a radio wave does not have to be taken into account much. Therefore, the range T is formed in a spherical surface shape centering on the projector 10. As shown in FIG. 7A, when the user U is performing operation for indicating a position on the screen 40 using the operation device 30, the operation device 30 is not present within the range T.

If determining in step S4 that the distance is the first threshold or less (YES in step S4), the CPU 11 increments the counter value of the timer by "1" (step S6). The counter value of the timer is, for example, a value indicating the number of seconds. As shown in FIG. 7B, when the user U takes an action for raising the operation device 30 and directing the operation device 30 to the direction of the projector 10, the operation device 30 is located within the range T. When this action is taken, the user U is not performing the operation for indicating a position on the screen 40.

Subsequently, the CPU 11 determines whether the counter value of the timer is a predetermined value or more (step S7). The predetermined value may be set before shipment of the projector 10 or may be set by manual setting or the like by the user U.

If determining "NO" in step S7, the CPU 11 returns the processing to the processing in step S2 while keeping the counter value of the timer. When the action of the user U explained with reference to FIG. 7B continues for a predetermined time or more, the CPU 11 determines "YES" in step S7. The CPU 11 switches the mode of the projector 10 (step S8). The CPU 11 switches the mode from the interactive mode to the PC mode.

Note that, with the switching of the modes as an opportunity, the CPU 11 initializes the counter value of the timer.

Subsequently, the CPU 11 notifies the user U of the switching of the mode of the projector 10 (step S9). The CPU 11 notifies, for example, the mode after the switching.

After the notification, the CPU 11 returns the processing to the processing in step S2. Since the mode of the projector 10 is the PC mode at this point, as explained with reference to FIG. 4B, the CPU 11 performs, according to the position on the screen 40 indicated by the operation device 30, processing for selecting an object corresponding to the position.

In the following explanation, in a period in which projection of an image on the screen 40 is performed, the CPU 11 repeatedly executes the processing explained with reference to FIG. 6. For example, when the mode of the projector 10 is the PC mode, when the distance between the operation device 30 and the projector 10 is the first threshold or less continuously for a predetermined time, the CPU 11 switches the processing from the PC mode to the interactive mode.

According to the basic operation of the switching of the mode of the projector 10 explained above, for the switching of the mode, the user U does not have to perform operation for indicating a position on the screen 40 using the operation device 30. Therefore, with the projector 10, it is possible to reduce labor and time required of the user U to switch the mode. Further, in the projector 10, when the distance between the operation device 30 and the projector 10 is the first threshold or less continuously for the predetermined time, the CPU 11 switches the mode. Therefore, it is less likely that the projector 10 and the operation device 30 approach against the will of the user U and the mode is switched. Consequently, it is desirable to set the first threshold taking into account prevention of the switching of the modes against the will of the user U from easily occurring and prevention of time of an action that should be taken by the user U for the switching from becoming too long.

The projector 10 may apply the basic operation to perform the switching of the modes according to B: Operation example 1 to E: Operation example 4 explained below. In the explanation of the operation examples, processing steps same as the processing steps explained in the section of A: Basic operation are denoted by the same signs and explanation of the processing steps is omitted as appropriate.

B: Operation Example 1

Figure 8:
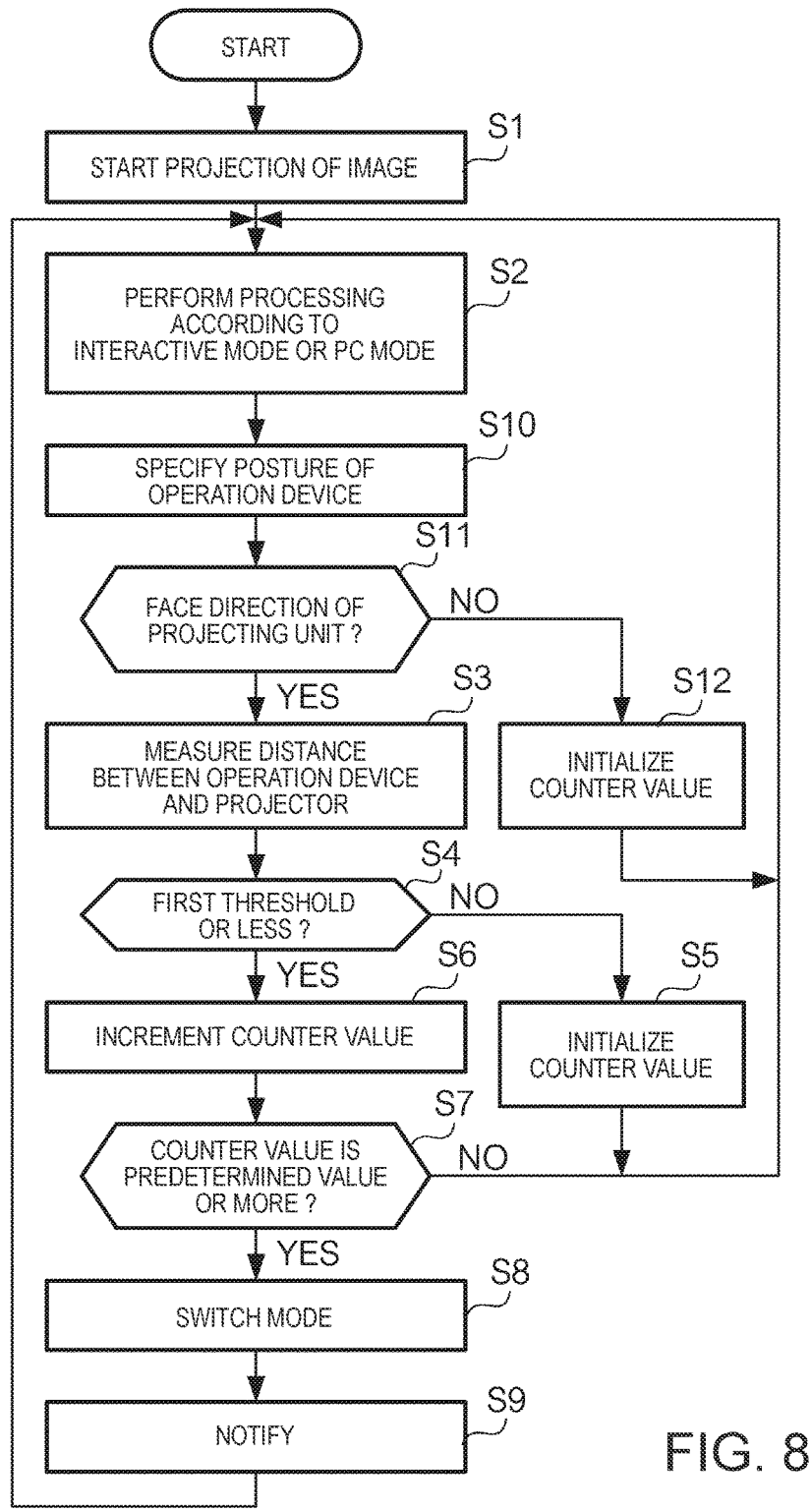
FIG. 8 is a flowchart for explaining a flow of the switching of the modes in an operation example 1 in the projector according to the embodiment.

FIG. 8 is a flowchart for explaining a flow of switching of the modes in an operation example 1 in the projector 10. In the operation example 1, the projector 10 controls presence of absence of the switching of the modes according to a posture of the operation device 30.

The CPU 11 starts projection of an image in step S1 and, after starting processing corresponding to the mode of the projector 10 in step S2, specifies a posture of the operation device 30 (step S10). The CPU 11 acquires, for example, posture data indicating a posture measured by the gyro sensor 37 of the operation device 30 from the operation device 30 via the short-range radio communication unit 19.

Subsequently, the CPU 11 determines whether the specified posture of the operation device 30 is the posture facing the direction of the projecting unit 16 (corresponding to the first posture according to the invention) (step S11). The posture of the operation device 30 facing the direction of the projecting unit 16 is set in advance. The projector 10 is a type set on the ceiling. Therefore, the posture is set to, for example, a posture in which an extending direction of the operation device 30 coincides with or substantially coincides with the vertical direction.

If determining "NO" in step S11, the CPU 11 initializes the counter value of the timer (step S12). The CPU 11 returns the processing to the processing in step S2. As shown in FIG. 7A, when the user U is performing operation for indicating a position on the screen 40 using the operation device 30, it is estimated that the operation device 30 does not face the direction of the projecting unit 16. Therefore, the CPU 11 does not start the distance measurement in step S3 and repeatedly executes the processing steps of step S2, step S10, step S11; NO, and step S12 in this order. Consequently, when the posture of the operation device 30 is another posture (corresponding to the second posture according to the invention) different from the posture facing the direction of the projecting unit 16, the CPU 11 does not perform the switching of the modes due to the determination that the distance between the operation device 30 and the projector 10 is the first threshold or less.

If determining "YES" in step S11, the CPU 11 advances the processing to the processing in step S3. As shown in FIG. 7B, when the user U takes the action for raising the operation device 30 and directing the operation device 30 to the direction of the projector 10, the operation device 30 takes the posture facing the direction of the projecting unit 16. In this case, the CPU 11 measures the distance between the operation device 30 and the projector 10 in step S3. Thereafter, as explained in the section of A: Basic operation, the CPU 11 executes the processing steps of steps S4 to S9. Consequently, when the posture of the operation device 30 is the posture facing the direction of the projecting unit 16, the CPU 11 performs the switching of the modes due to the determination that the distance between the operation device 30 and the projector 10 is the first threshold or less.

Note that, in this operation example, rather than transmitting the posture data to the projector 10, the operation device 30 may emit light having a specific wavelength or light emission pattern using the light emitting unit 35 when the operation device 30 takes a predetermined posture. In this case, the CPU 11 may analyze picked-up image data acquired from the camera unit 17 and, when the light having the specific wavelength or the light emission pattern is detected, determine "YES" in step S11.

According to the operation example 1 of the projector 10 explained above, it is possible to reduce the likelihood that the projector 10 and the operation device 30 approach against the will of the user U and the modes are switched.

C: Operation Example 2

Figure 9:
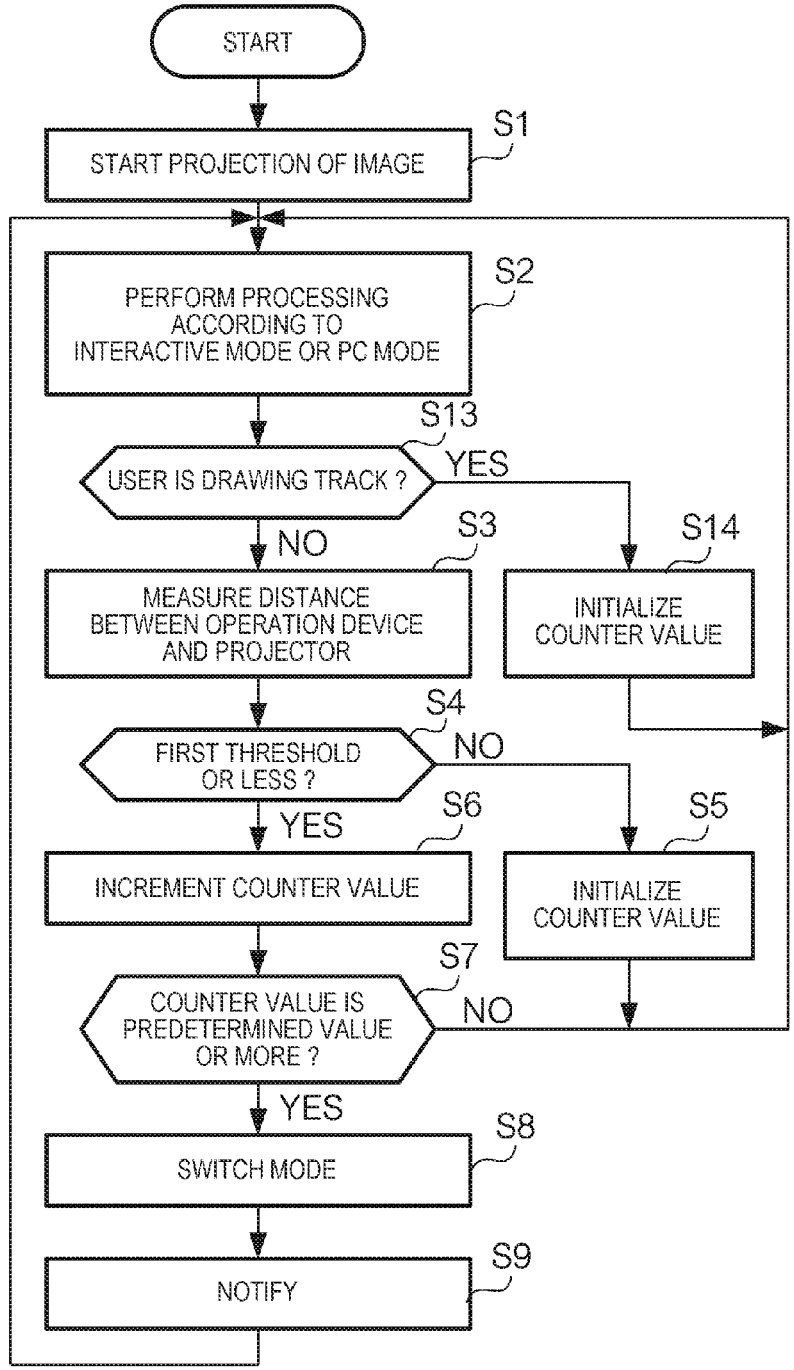
FIG. 9 is a flowchart for explaining a flow of the switching of the modes in an operation example 2 in the projector according to the embodiment.

FIG. 9 is a flowchart for explaining a flow of switching of the modes in an operation example 2 in the projector 10. In the operation example 2, the projector 10 controls presence or absence of the switching of the modes on the basis of whether the user is drawing a track on the screen 40.

After starting projection of an image in step S1 and starting processing corresponding to the mode of the projector 10 in step S2, the CPU 11 determines whether the user U is drawing a track using the operation device 30 (step S13). For example, when the distance between the operation device 30 and the screen 40 is a second threshold or less, the CPU 11 determines that the user U is drawing a track. A method for measuring the distance between the operation device 30 and the screen 40 may be a publicly-known method. As the method, there are, for example, a method of measuring the distance using a stereo camera and a method of analyzing an image of a shadow of the operation device 30 projected on the screen 40 included in picked-up image data of the camera unit 17. Besides, in the interactive mode, in a period in which there is a change in a track image displayed on the screen 40, the CPU 11 may determine that the user U is drawing a track.

If determining "YES" in step S13, the CPU 11 initializes the counter value of the timer (step S14). The CPU 11 returns the processing to the processing in step S2.

If determining "NO" in step S13, the CPU 11 performs measurement of the distance in step S3. Thereafter, as explained in the section of A: Basic operation, the CPU 11 executes the processing steps in steps S4 to S9.

Note that, in the operation example 2, when detecting contact with the screen 40 using a pressure sensor or the like, the operation device 30 may determine that the user U is drawing a track and emit light having a specific wavelength or light emission pattern. In this case, the CPU 11 may analyze the picked-up image data acquired from the camera unit 17 and, when the light having the specific wavelength or light emission pattern is detected, the CPU 11 may determine "YES" in step S13.

According to the operation example 2 of the projector 10 explained above, when the user U indicates a position on the screen 40 using the operation device 30, it is possible to reduce the likelihood that the modes are switched.

D: Operation Example 3

Figure 10:
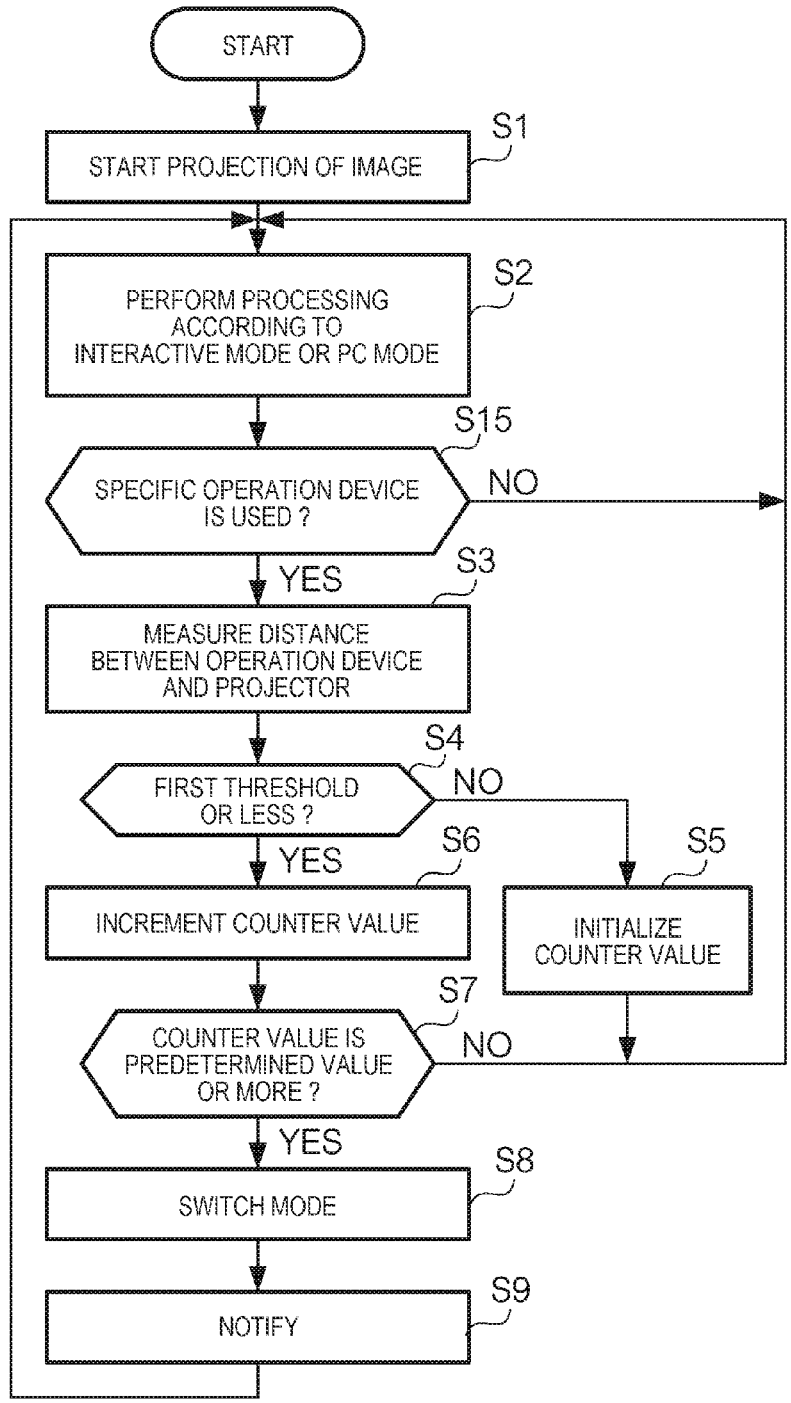
FIG. 10 is a flowchart for explaining a flow of the switching of the modes in an operation example 3 in the projector according to the embodiment.

FIG. 10 is a flowchart for explaining a flow of switching of the modes in an operation example 3 in the projector 10. In the operation example 3, it is assumed that a plurality of the operation devices 30 are used. The projector 10 controls presence or absence of the switching of the modes on the basis of the used operation device 30.

After starting projection of an image in step S1 and starting processing corresponding to the mode of the projector 10 in step S2, the CPU 11 determines whether a specific operation device 30 (corresponding to the first indicator according to the invention) is used by the user U (step S15). The CPU 11 identifies the individual operation device 30 in use by, for example, recognizing a light emission pattern of the light emitting unit 35 of the operation device 30. As another method, the CPU 11 may receive identification information of the operation device 30 via the short-range radio communication unit 19 and identify the individual operation device 30 in use. The CPU 11 determines whether the operation device 30 in use is permitted to switch the modes. A relation between the respective operation devices 30 and propriety of the switching of the modes only has to be set in the projector 10 in advance by the user U.

If determining "NO" in step S15, the CPU 11 returns the processing to the processing in step S2. For example, when the user U is using another operation device 30 (corresponding to the second indicator according to the invention) different from the specific operation device 30 among the plurality of operation devices 30, the CPU 11 does not measure the distance between the other operation device 30 and the projector 10. Therefore, the CPU 11 does not perform the switching of the modes due to the determination that the distance between the other operation device 30 and the projector 10 is the first threshold or less.

If determining "YES" in step S15, the CPU 11 performs the measurement of the distance in step S3. Thereafter, as explained in the section of A: Basic operation, the CPU 11 executes the processing steps in steps S4 to S9.

According to the operation example 3 of the projector 10 explained above, when the specific operation device 30 is used and approaches the projector 10, the CPU 11 switches the modes. For example, it is possible to set the modes to be switched when the operation device 30 used by a teacher approaches the projector 10 and not to be switched even if the operation device 30 used by a student approaches the projector 10. Therefore, according to the operation example 3, substantially, it is possible to impart or not to impart authority for switching the modes to each user who uses the operation device 30.

E. Operation Example 4

Figure 11:
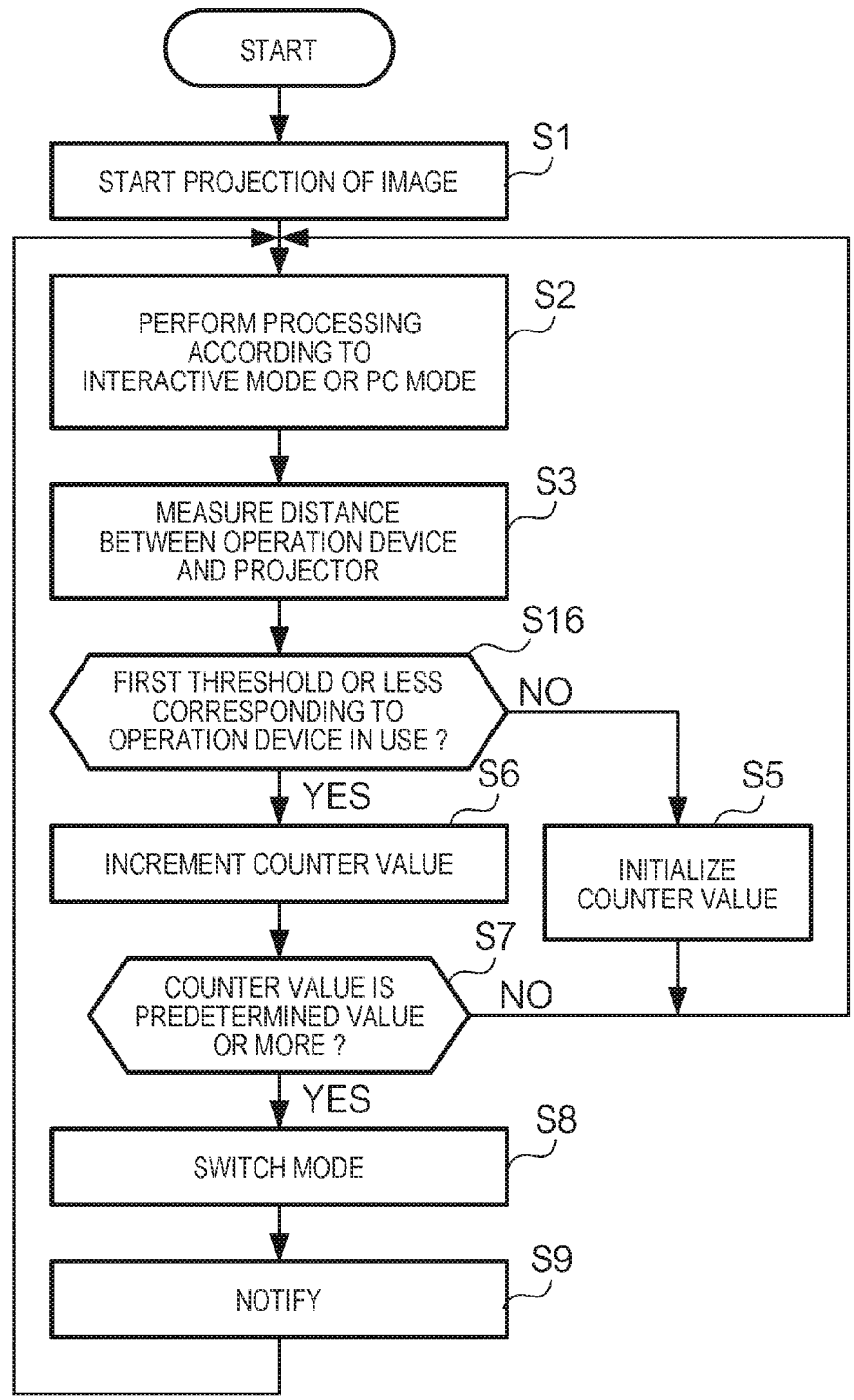
FIG. 11 is a flowchart for explaining a flow of the switching of the modes in an operation example 4 in the projector according to the embodiment.

FIG. 11 is a flowchart for explaining a flow of switching of the modes in an operation example 4 in the projector 10. In the operation example 4, it is assumed that a plurality of the operation devices 30 are used. The projector 10 specifies a first threshold for each individual operation device 30.

After starting projection of an image in step S1 and starting processing corresponding to the mode of the projector 10 in step S2, the CPU 11 performs measurement of the distance in step S3. Subsequently, the CPU 11 determines whether the measured distance is the first threshold, which corresponding to the operation device 30 used by the user U, or less (step S16). A relation between the respective operation devices 30 and the first threshold only has to be set in the projector 10 in advance by the user U.

If determining "NO" in step S16, the CPU 11 initializes the counter value of the timer (step S5). The CPU 11 returns the processing to the processing in step S2.

If determining "YES" in step S16, the CPU 11 increments the counter value of the timer by "1" in step S6. Thereafter, as explained in the section of A: Basic operation, the CPU 11 executes the processing steps in steps S7 to S9.

According to the operation example 4 of the projector explained above, it is possible to specify, for each individual operation device 30, a condition of the distance between the operation device 30 and the projector 10 for switching the modes. For example, the first threshold for the operation device 30 used by an adult is set smaller than the first threshold for the operation device 30 used by a child. Consequently, even when physical characteristics of a plurality of users are different, it is less likely that the modes are switched against the will of the user and, conversely, the modes are not switched even if the user desires to switch the modes.

The projector 10 may perform a combined operation of two or more operation examples among B: Operation example 1 to E: Operation example 4 explained above. In the case of B: Operation example 1 to D: Operation example 3, the projector 10 may continuously perform the measurement of the distance in step S3 and control presence or absence of the switching of the modes according to the methods explained in the operation examples.

Modifications

The invention can be carried out in forms different from the embodiment. Modifications explained below may be respectively combined as appropriate.

Figure 12A:
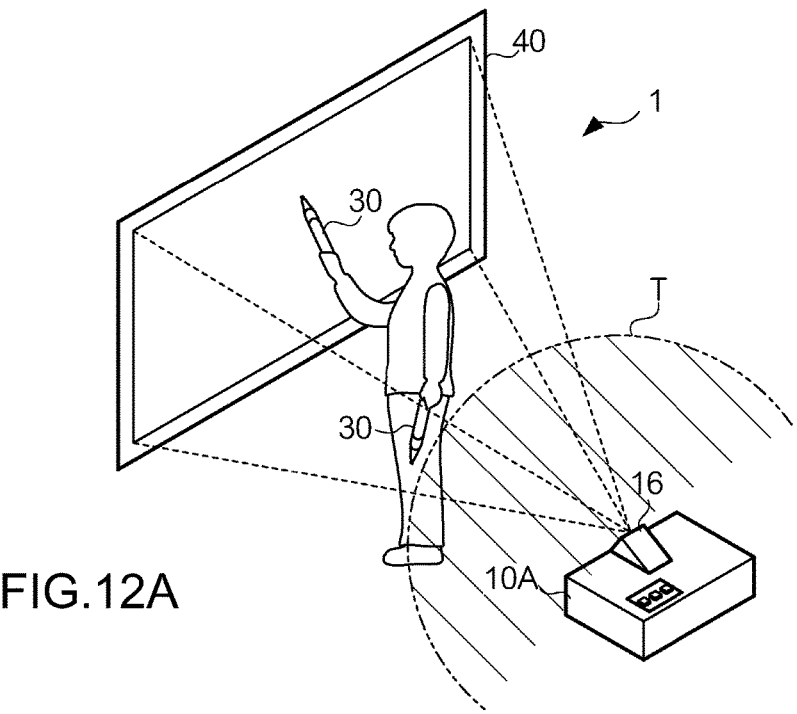
FIGS. 12A and 12B are explanatory diagrams of actions taken by the user when switching modes of a projector according to a modification of the invention.
Figure 12B:
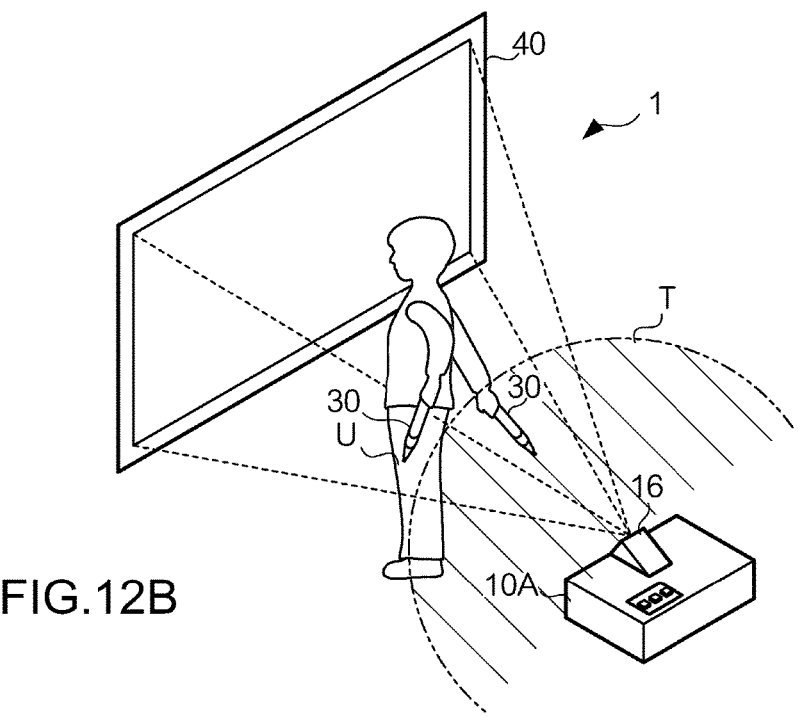

The projector 10 is the short-focus projector of the wall hanging-type. However, a projector of another form may be used. For example, a projector 10A set on a horizontal surface of a desk or the like and used as shown in FIGS. 12A and 12B may be used. As shown in FIG. 12A, when the user U indicates a position on the screen 40 using the operation device 30, the operation device 30 is absent within the range T in which the distance is the first threshold or less from the projector 10A. Therefore, a mode of the projector 10A is not switched. On the other hand, when the user U directs the operation device 30 to the direction of the projector 10A (the projecting unit 16), the operation device 30 is present within the range T. Therefore, the mode of the projector 10 is switched.

The display apparatus according to the invention is not limited to a front projection-type projector and may be, for example, a rear projection-type projector or a liquid crystal display.

In the embodiment, the projector 10 performs the measurement of the distance on the basis of the intensity of the signal of the short-range radio communication. However, the operation device 30 may perform the measurement of the distance. Specifically, the CPU 31 of the operation device 30 receives the signal of the short-range radio communication from the projector 10 via the short-range radio communication unit 36. The CPU 31 transmits distance data indicating the measured distance or notification data for notifying that the measured distance is the first threshold or less to the projector 10 via the short-range radio communication unit 36. Alternatively, the CPU 31 may notify, according to control of the light emission pattern of the light emitting unit 35, the projector 10 that the measured distance is the first threshold or less. The projector 10 performs control concerning the switching of the modes on the basis of whether the measured distance is the first threshold or less.

Figure 13:
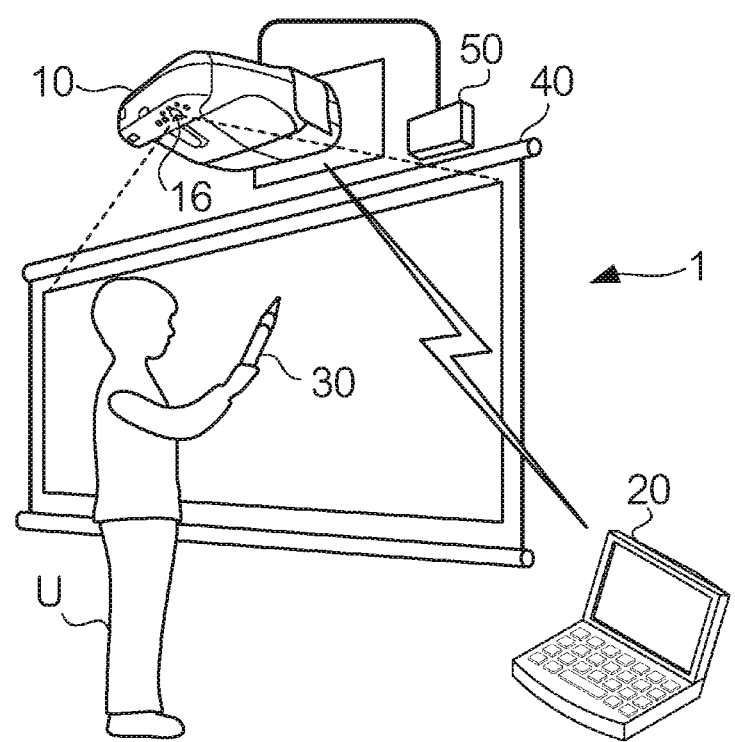
FIG. 13 is a diagram showing the overall configuration of a display system according to the modification of the invention.

The projector 10 does not have to include a component for measuring the distance between the projector 10 and the operation device 30. For example, as shown in FIG. 13, a distance measuring device 50 (distance measuring unit) for measuring the distance to the operation device 30 may be provided separately from the projector 10. The distance measuring device 50 is provided above the screen 40. The distance measuring device 50 includes, for example, a component equivalent to the short-range radio communication unit 19. The distance measuring device 50 measures the distance to the operation device 30 on the basis of the intensity of a signal of short-range radio communication received from the operation device 30. The distance measuring device 50 transmits distance data indicating the measured distance or notification data for notifying that the measured distance is the first threshold or less to the projector 10. The projector 10 performs control concerning the switching of the modes on the basis of whether the distance between the operation device 30 and the distance measuring device 50 is the first threshold or less. In this way, a position serving as a reference of measurement of the distance to the operation device 30 is not limited to the position of the projector 10.

A position where the distance measuring device 50 is set is not limited to the position above the screen 40. The distance measuring device 50 may be provided on the left, on the right, or below the screen 40. The distance measuring device 50 may be included in an operation device provided on the outside of the projector 10 to operate the projector 10.

A method of measuring the distance between the operation device 30 and the projector 10 is not limited to the method of measuring the distance using the reception intensity of the signal of the short-range radio communication. For example, a publicly-known ultrasonic or infrared distance measuring sensor may be used.

The modes of the display apparatus according to the invention are not limited to the interactive mode and the PC mode. The modes of the display apparatus according to the invention may be, for example, modes for specifying types of a track image to be drawn. As the modes, there are, for example, modes of a line type, thickness, a color, and a shape of the track image.

Parts of the components and the operations explained in the embodiment may be omitted.

For example, when the distance between the projector 10 and the operation device 30 is the first threshold or less, the projector 10 may immediately switch the modes without measuring time using the timer. When the distance to the operation device 30 is the first threshold or less, the projector 10 may switch the mode of the projector 10 from the first mode to the second mode and may not switch the mode from the second mode to the first mode. In this case, the switching of the mode from the second mode to the first mode may be performed according to, for example, selection of an object displayed on the screen 40.

The functions realized by the CPU 11 can be realized by a combination of a plurality of computer programs and can be realized by cooperation of a plurality of hardware resources. When the functions of the CPU 11 are realized using a computer program, the computer program may be provided in a state in which the computer program is stored in a computer-readable recording medium such as a magnetic recording medium (a magnetic tape, a magnetic disk (a HDD (Hard Disk Drive) or an FD (Flexible Disk)), etc.), an optical recording medium (an optical disk, etc.), a magneto-optical recording medium, or a semiconductor memory or may be distributed via a network. The invention can also be grasped as a control method for the display apparatus.

What is claimed is:

1. A display apparatus that displays an image on a display surface, the display apparatus comprising:
a processor configured to:
determine whether a distance between an indicator for indicating a position on the display surface and a distance measuring unit configured to measure the distance to the indicator is a first threshold or less;
switch, when a mode of the display apparatus is a first mode, the mode from the first mode to a second mode when:
(i) the distance between the indicator and the distance measuring unit is determined to be at the first threshold or less, and
(ii) a posture of the indicator is a first posture;
not switch the mode of the display apparatus from the first mode to the second mode when the posture of the indicator is a second posture different from the first posture;
detect the position on the display surface indicated by the indicator; and
when an indication of a first position on the display surface is detected, perform first processing corresponding to the first position when the mode is the first mode and perform second processing different from the first processing corresponding to the first position when the mode is the second mode; and a projector configured to project the image on a projection surface, wherein the display surface is the projection surface on which the image is projected, and the first posture is a posture in which the indicator faces a direction of the projector.

2. The display apparatus according to claim 1, wherein the processor is further configured to switch the mode from the first mode to the second mode when the distance between the indicator and the distance measuring unit continues to be determined as the first threshold or less for a predetermined time or more.

3. The display apparatus according to claim 1, wherein, when a distance between the indicator and the display surface is a second threshold or less, the processor does not switch the mode from the first mode to the second mode.

4. The display apparatus according to claim 1, wherein the processor is programmed to notify a user that the mode is switched from the first mode to the second mode.

5. The display apparatus according to claim 1, wherein, when a plurality of indicators including a first indicator and a second indicator different from the first indicator are used, and when a distance between the first indicator and the distance measuring unit is determined to be at the first threshold or less, the processor switches the mode from the first mode to the second mode and does not perform the switching of the mode from the first mode to the second mode due to a determination that a distance between the second indicator and the distance measuring unit is the first threshold or less.

6. The display apparatus according to claim 1, further comprising a plurality of indicators, wherein the processor specifies the first threshold for each indicator of the plurality of indicators.

7. The display apparatus according to claim 1, wherein the distance measuring unit is one of either (i) a radio communication circuit, (ii) an ultrasonic distance measuring sensor, and (iii) an infrared distance measuring sensor.

8. A control method for a display apparatus that displays an image on a display surface, the control method comprising:

determining whether a distance between an indicator for indicating a position on the display surface and a distance measuring unit configured to measure the distance to the indicator is a first threshold or less;

switching, when a mode of the display apparatus is a first mode, the mode from the first mode to a second mode when:
 (i) the distance between the indicator and the distance measuring unit is determined to be at the first threshold or less; and
 (ii) a posture of the indicator is a first posture;

not switching the mode of the display apparatus from the first mode to the second mode when the posture of the indicator is a second posture different from the first posture;

detecting the position on the display surface indicated by the indicator;

when an indication of a first position on the display surface is detected, performing first processing corresponding to the first position when the mode is the first mode and performing second processing different from the first processing corresponding to the first position when the mode is the second mode; and projecting the image on a projection surface, wherein
 the display surface is the projection surface on which the image is projected, and
 the first posture is a posture in which the indicator faces a direction from which the image is projected.

9. The control method according to claim 8, wherein the distance measuring unit is one of either (i) a radio communication circuit, (ii) an ultrasonic distance measuring sensor, and (iii) an infrared distance measuring sensor.

* * * * *